J. H. A. MORICHARD.
INDICATING APPARATUS FOR CHARTS, MAPS, AND PLANS.
APPLICATION FILED SEPT. 12, 1918.
1,309,259.
Patented July 8, 1919.
2 SHEETS—SHEET 1.
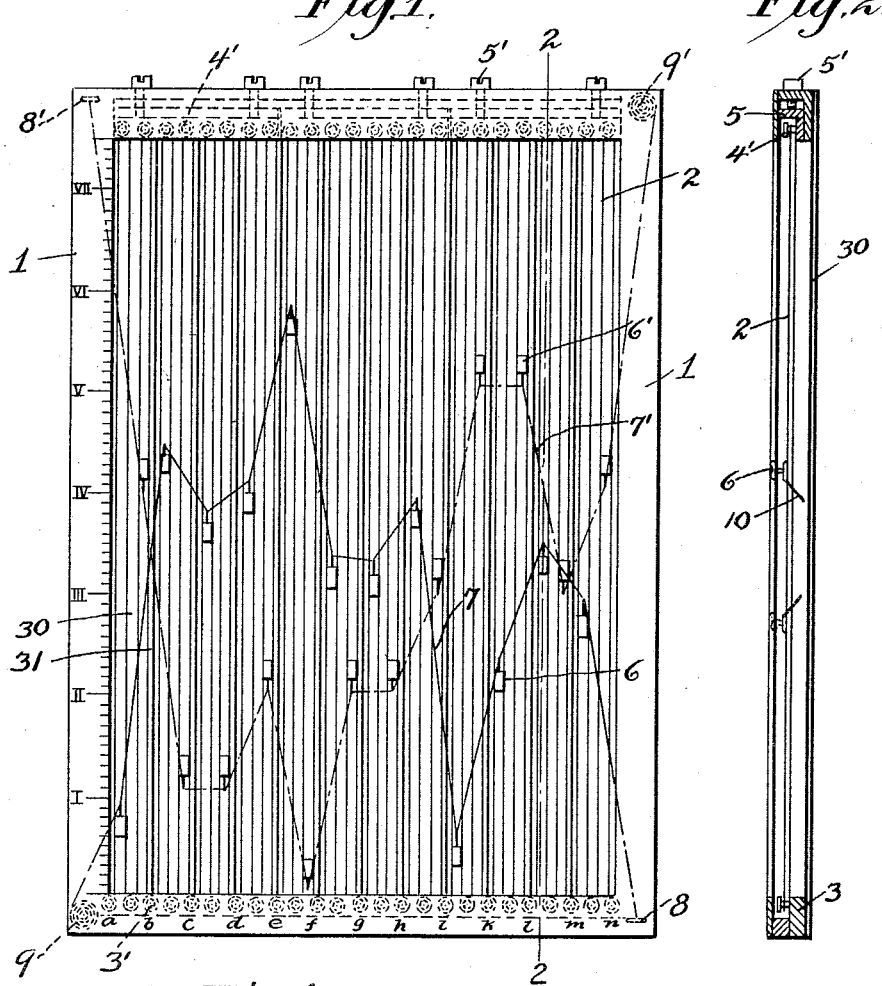
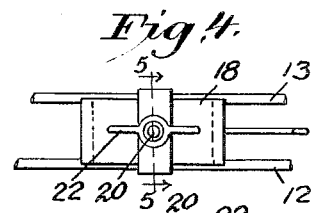
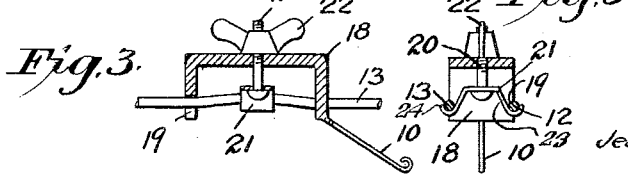
Inventor:
Jean Henri Adrien Morichard
By C. P. Goepel
his Attorney J. H. A. MORICHARD.
INDICATING APPARATUS FOR CHARTS, MAPS, AND PLANS.
APPLICATION FILED SEPT. 12, 1918.

1,309,259.

Patented July 8, 1919.
2 SHEETS—SHEET 2.

Inventor:
Jean Henri Adrien Morichard
By C. P. Goepel
his Attorney

UNITED STATES PATENT OFFICE.

JEAN HENRI ADRIEN MORICHARD, OF AMSTERDAM, NETHERLANDS.

INDICATING APPARATUS FOR CHARTS, MAPS, AND PLANS.

1,309,259.   Specification of Letters Patent.   Patented July 8, 1919.

Application filed September 12, 1918. Serial No. 253,828.

*To all whom it may concern:*

Be it known that I, JEAN HENRI ADRIEN MORICHARD, of Amsterdam, Netherlands, have invented new and useful Improvements in Indicating Apparatus for Charts, Maps, and Plans, of which the following is a specification.

This invention relates to an indicating apparatus for use in connection with maps, plans, charts and the like, comprising a frame adapted to be placed over the chart, map or other similar article and carrying a series of parallel wires on which movable indicators are adjustable into different positions preferably in relation to characteristic divisions and a graduated scale on said frame, for graphically indicating desired information; such as battle lines, distances and positions on maps and stocks of different materials on hand in factories and stocks of merchandise of different kinds on hand in stores or shops or out on commission.

This invention embodies certain additions or improvements on the device of this character heretofore patented to me by Patent No. 1,279,403 dated September 17, 1918.

One object of the invention is to avoid the use of a great multiplicity of indicators disposed in close relation as in my device patented as aforesaid.

Another object of the invention is to provide a series of indicators in connected relation, the indicators being severally adjustable independently of one another without disrupting such relation or disturbing the positions of the others.

Another object of the invention is to adapt the apparatus for imparting simultaneously two lineal series of indications on the same frame and chart without enlarging the area thereof, the indicators of one series being adapted to overlap or pass the indicators of the other series.

Figure 1 of the accompanying drawings represents a plan of one embodiment of my invention.

Fig. 2 represents a vertical section thereof on line 2—2 of Fig. 1.

Fig. 3 represents a vertical section of one of the indicators.

Fig. 4 represents a plan view thereof.

Fig. 5 represents a transverse section on line 5—5 of Fig. 4.

The same reference numbers indicate corresponding parts in the different figures.

Figure 6:
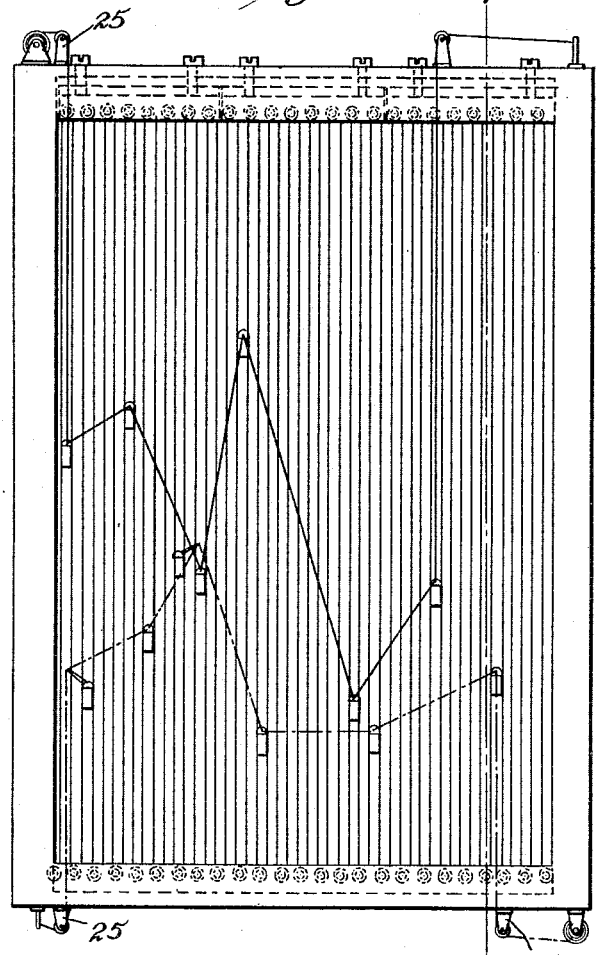
Fig. 6 represents a plan view of another embodiment of this invention.

In the embodiment shown in Figs. 1 and 2, a rectangular frame 1, adapted to be placed over a map, chart or plan 30 is provided along one side with a series of divisions, seven in number, indicated respectively by roman numerals I, II, III, IV, V, VI, and VII, disposed at equal distances apart from each other and from the top and bottom rail respectively. The same side rail is also provided with a graduated scale dividing each of the aforesaid divisions; each division being in this example separated into ten units. The bottom rail of said frame is provided with a supplemental bar 5 which is adjustable on said rail toward and from the bottom rail by means of set screws 5'. This movable bar carries a series of studs 4 disposed opposite the studs 3' of the bottom bar. A series of wires 2 are stretched in parallel relation between the studs 3' of the bottom rail and the studs 4 of the top rail and they are stretched to the proper tension by the adjustment of the supplemental bar 5. This bar 5 is preferably constructed in sections which are adjustable independently of one another as shown in Fig. 1 so as to get a sufficient and equal tension on the different wires.

The chart 30, in the example herein illustrated, is divided by lines 31 into a series of vertical columns, said lines terminating opposite the letters a—b, b—c, c—d, etc., each column being equal to the space between the centers of alternate wire holding pins. The wires of the superposed frame are so arranged that two indicators can move to or fro in each column in vertical or longitudinal direction.

In this direction, there are moreover, either on the chart or on the side-piece of the frame, scales made, which are indicated on the drawing by I, II, III. Be it now supposed that each column represents a certain article, whereof it is wanted to be known either the number in stock or the number in commission. By the scale along the vertical line, indicated by I, II, III, these numbers are given. According to the invention, the indicators 6, always placed between two wires, are now mutually connected by a thread, cord or the like 7. This thread, according to the example on the drawing, has one end fastened to a fixed point 8 of the frame, while the other end is connected with a spiral spring 9 or the like, that in its turn is fixed to the frame. The fixed point and also the spiral spring may not only be fastened at the outside of the frame, but also be entirely mounted in this frame. The last is to be preferred, both being then out of sight; this is shown in Fig. 1.

It is evident, that, to indicate the number of articles that for instance are in stock, the indicator has to be placed on the correct number only in the column concerned. The thread, strung by the indicators, then adjusts itself immediately according to the indication points of the indicators, and thus always gives an indication line according to the stock in hand of each article. If it is now wanted to have immediately on the same chart a survey of the number of articles in commission, this may, according to the invention, take place by the indicators 6 being so placed that their indication ends are situated in different planes. Each of these ends therefore is provided with a prolongation 10, that is mounted under different angles, so that their ends, which are provided with thread-receiving eyes, are situated in different planes. This is shown in Fig. 2. By this arrangement it is now possible to indicate different lines at the same time, because also the threads themselves are situated in different planes. As moreover one certain line in each column only wants one indicator, these indicators themselves may be moved to and fro in vertical direction independent from one another in the plane of the elastic connecting threads.

Fig. 1 for instance shows in dotted lines a second line, which is indicated by a second thread with matching indicators. This second thread is formed and guided in the same way as the first named. According to the above example the full line may thus for instance indicate the number in stock of the article mentioned in each column, while the dotted line may indicate the number of the articles in commission. It is evident that in this way also three or more indication threads may be used, which for a better survey easily may have different colors.

As said before, according to the invention, the indicators are so mounted that they can be fastened on the threads.

By the construction according to the Figs. 3-5 the indicator consists of a rectangular or otherwise shaped shackle 18 adapted to slide along the wires 12 and 13, being provided with grooves 19 by which it engages said wires. The shackle carries a bolt 20, which at its inner end is provided with a fixed head 21 and at its outer end with a wing nut 22. Over this bolt 20 is placed a plate 23 that embraces the two wires 12 and 13 by means of hooked ends 24. The bolt 20 is now brought in such a position, that the plate 23 with its ends 24 just touches the wires. In this position the shackle 18 and also the indicator may be moved on along the wires. As soon however as the wing nut has been given half a turn, the bolt is screwed toward the innerside of the shackle, the ends 24 engage the wires and by this means hold said wires, thus a further movement of the indicator is checked.

Figure 7:
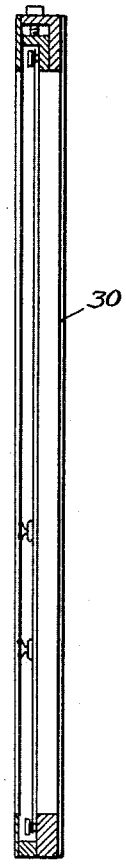
Fig. 7 represents a vertical section thereof on line 7—7 of Fig. 6.
Figure 8:
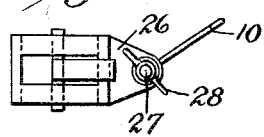
Fig. 8 represents a plan view of another form of indicator used in the last mentioned embodiment.
Figure 9:
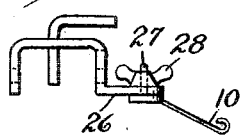
Fig. 9 represents a side elevation thereof.

By the form of construction as described hereinbefore, it is only necessary that the indicators can be moved in one direction. This case will happen mostly in practice. It is however very well possible to modify the construction in that way that the indicators can be moved, except in a perpendicular also in a horizontal direction, or better said, that the initial and final points of the parts of the broken line also may be changeable in horizontal direction. This last for instance may happen at graphical representations for scientific purposes and in all those cases, where there is no fixed division in columns. The Figs. 6 and 7 illustrate such a modified form of construction. By this construction the threads, that mutually connect the indicators, are mounted and guided in the same way as by the construction according to Fig. 1. The construction of the frame is also the same. By way of example the fixed points as well as the spiral springs for straining the wires are at this construction put on the outside of the frame. The strung connecting-thread is now by this construction guided over rollers 25, that are slidably mounted on opposite ends of the frame. These rollers too may as well be mounted on the outside of the frame as entirely built herein. In proportion as the line to be indicated occupies a larger or smaller breadth of the chart put under the frame, the rollers 25 are moved along the frame and fastened in the exact position desired. This is shown in Fig. 6. To avoid removal and readjustment of all the indicators themselves, some of them may be adjusted independently of the line or thread over the whole breadth of the frame between any two wires and the prolongations 10 may be made to engage the wires, but in forming a line only hitch those indicators at the wires, that have to indicate the initial and final points of the parts of the line. It may now happen by this construction that of, for instance, two lines a point to be indicated is situated between the same two threads. In order to be able to indicate these points for both lines well, the indicator is, according to the invention, formed in such way that the prolongation, the end of which is hooked to hitch the thread, can be turned and regulated in a horizontal plane, when the indicators are placed on the wires. Such a construction is shown in the Figs. 8-9 on an enlarged scale. The indicator shown in this figure is of the same construction as that of the Figs. 3-5. In a crooked end 26 of the shackle is put a bolt 27, that with one side is fixed to or forms one whole with the prolongation 10, while hereon at the other side a wing nut 28 or the like is mounted. By unscrewing this wing nut 28 it is now easy to modify the position of the prolongation 10 in the horizontal plane. Thus it is possible to indicate also by means of only one indicator, strained between two wires, points that are situated on the sides of these threads.

Having thus fully described my invention, what I claim is:—

1. An indicating apparatus for charts comprising a frame adapted to be placed over the chart, parallel wires stretched on said frame, a series of indicators movable on said wires, and a transverse thread engaging said indicators and having terminals secured on said frame, one of said terminals being in the form of a spring winding device, whereby said thread may be adjusted to conform to the adjustment of said indicators.

2. An indicating apparatus for charts comprising a frame adapted to be placed over the chart, parallel wires stretched on said frame, a series of indicators movable on said wires, means for locking said indicators in adjusted position therein, and a transverse thread engaging said indicators and having terminals secured on said frame, one of said terminals being in the form of a spring winding device, whereby said thread may be adjusted to conform to the adjustment of said indicators.

3. An indicating apparatus for charts comprising a frame adapted to be placed over the chart, parallel wires stretched on said frame, a series of indicators movable on said wires, and a transverse thread engaging said indicators and having terminals secured on said frame, one of said terminals being in the form of a spring winding device, whereby said thread may be adjusted to conform to the adjustment of said indicators, said terminals being adjustable toward or from each other on said frame.

4. An indicating apparatus for charts comprising a frame adapted to be placed over the chart, parallel wires stretched on said frame, two series of indicators movable on said wires, the pointers of one series of indicators being in a different plane from the pointers of the other series, two transverse threads engaging said series respectively and having terminals secured to said frame, one terminal for each thread being in the form of a spring winding device, and the pointers of one series of indicators being in a different plane from the pointers of the other series, said threads being adjustable into interlapping relation under certain movements of the indicators.

5. An indicator for charts comprising a frame adapted to be placed over a chart, parallel wires stretched on said frame, and indicators each engaging two of said parallel wires and movable between them, said indicators having swiveling pointers and means for locking said pointers in adjusted positions.

6. An indicator for charts comprising a frame adapted to be placed over a chart, parallel wires stretched on said frame, and indicators each engaging two of said parallel wires and movable between them, said indicators being provided with means for locking them in adjusted positions on said wires.

7. An indicating apparatus for charts comprising a frame adapted to be placed over the chart, parallel wires stretched on said frame, a series of indicators movable on said wires, and a transverse thread engaging said indicators and having terminals secured on said frame, one of said terminals being in the form of a spring winding device, whereby said thread may be adjusted to conform to the adjustment of said indicators, said indicators having hooked pointers adapted to engage said threads.

In testimony whereof I affix my signature in presence of two witnesses.

JEAN HENRI ADRIEN MORICHARD.

Witnesses:
H. P. JORRITSMA,
C. M. VABEEK.